United States Patent Office 3,361,128
Patented Jan. 2, 1968

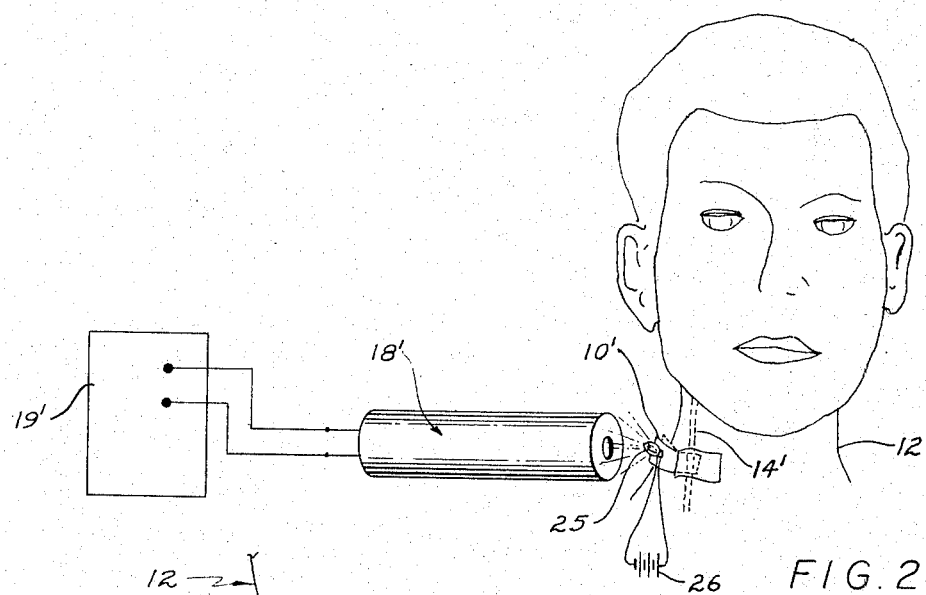
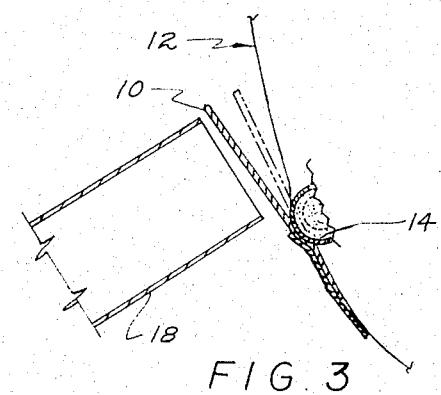
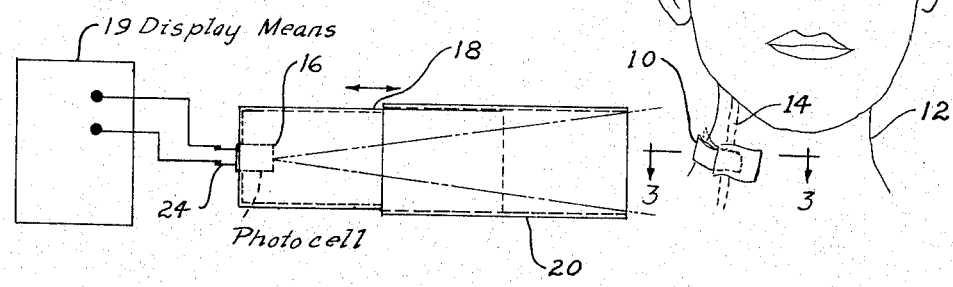

3,361,128
APPARATUS FOR DETECTING VENOUS
PULSATIONS
Arnold L. Colman, 97 Turquoise,
San Francisco, Calif. 94131
Filed Feb. 24, 1965, Ser. No. 434,935
5 Claims. (Cl. 128—2.05)

ABSTRACT OF THE DISCLOSURE

An apparatus for continuously measuring heartbeat through detection and recordation of venous pulsations, having a tab adapted for attachment in close proximity to a surface vein of a patient. The apparatus includes a shielded light-responsive device disposed in close proximity to the tab. When the tab is deflected by pulsations in the vein, the intensity of light received by the device varies in corresponding relation to the pulsations. Apparatus is provided to continuously measure and record the magnitude of the light received.

---

This invention relates to apparatus for detecting cardiac functions and more particularly to apparatus for detecting and recording the activity of the heart.

The practice of diagnosing cardiac atrophies and ailments by observing jugular pulsation at the bedside has been utilized by physicians for a considerable time. The value of such means of diagnostication, however, has been over-shadowed by the advent of electrocardiography, i.e., recording electrical manifestations of the heart beat. A great deal of the information, however, can still be obtained from direct vascular inspection.

In many instances in order to reach certain conclusions the electrocardiographer must assume facts which may be readily ascertained by simple direct observation of the patient's neck veins. For example, a simple electrocardiographic tracing of a normal person would comprise in the order named: (1) a small deflection wave caused by atrial excitation (P wave); (2) a resting interval (PR segment) denoting passage of electrical impulses from atria to ventricles; (3) a rapid tall deflection provided by ventricular excitation (QRS group); and (4) a slow deflection illustrating ventricular recovery (T wave) of uncertain significance.

An electrocardiographer may assume under certain circumstances, for example, that a P wave may be buried in a given QRS group. By observing the jugular pulse, on the other hand, there would be no doubt in the electrocardiographer's mind that such would be the case when giant atrial (cannon) waves are seen in the jugular pulse, as such waves occur only when the right atrium contracts against a closed tricuspid valve.

For similar reasons observance of the presence and degree of regularity of cannon waves may be of great value in diagnosing ventricular tachycardia and atrial or nodal tachycardia with associated intraventricular conduction defect since the one includes regular cannon waves or none at all, while the other gives rise to sporadic cannon waves.

In addition, the value of observing venous pulsation is well established in diagnosing conditions such as tricuspic stenosis and insufficiency, constrictive pericarditis or endocarditis, pulmonic stenosis, pulmonary hypertension and right heart failure, to name but a few of the well known conditions.

One method of establishing better observation of vascular movement incorporates the placement of an indicator tab in a lever arm position adjacent to a vein. The movement of the vein thus causes a deflection of the tab in a way that gives mechanical amplification of the movement. In one prior art device the aforesaid technique was used by establishing a light source which was impinged directly onto a photocell. The indicating tab was placed to intercept the light passing from the light source to the photocell in a manner similar to that of a photographic shutter. The degree of deflection of the indicating strip would determine the amount of light passing between the light source and the photocell. The output of the photocell was then recorded on a conventional readout recorder used in electrocardiography.

In the present invention a greatly simplified method of photoelectric reading of the indicator tab has been effected. It is the principal object of this invention to provide a photoelectric transducer mounted within a light shielding sleeve which restricts the light entry to the photo transducer to a substantially narrow angular area. The detecting device is then pointed at the indicator (which, of course, is placed in a position to be moved by vascular activity). By this means the indicator is moving in a fore-and-aft relationship with respect to the shield for the photo transducer. The effect of the fore-and-aft movement functions to limit or extend the light sensed by the transducer. It has been found that with this simple expedient extremely accurate and sensitive readings can be obtained without the necessity of aligned light sources as was required in the prior art devices. The advantage of employing ambient light is obvious where vascular observations must be obtained under less than ideal conditions. It is also important to note that the portability and the set-up time for taking recorded readings in accordance with the present invention is reduced to an absolute minimum as contrasted with the more complex and bulky equipment disclosed in the prior art.

Another feature and advantage of this invention lies in the fact that the indicator tab can be placed in any position to obtain movement and is not restricted to paricular angles of deflection, in order to get a photo reading of great accuracy. This is due to the fact that the transducer assembly itself can be aligned with little difficulty to obtain fore-and-aft relative movement.

Another embodiment in accordance with the present invention includes a light-weight, low energy source provided with the indicator tab and which can be mounted thereon. In this embodiment the tab must be positioned to have fore-and-aft movement with respect to the light tunnel and the photo transducer. A differential reading is obtained due to the distance change between the light source and the photo transducer upon movement of the indicating device in much the same manner as the fore-and-aft movement of the indicator tab where the light source is not employed. In the latter case, however, the amount of ambient light entering the tube is either extended or minimized.

Accordingly, it is an object of this invention to provide an improved method for recording vascular pulsations which permits observation of veins while the recording is being made and which permits simultaneous palpitation of the carotid artery and auscultation of the heart.

It is another object of this invention to provide a system for photoelectric recording of venous pulses utilizing ambient light as the only light source or which can be alternately utilized with a light source.

Other features and advantages of the invention will be readily understood upon reading the following detailed specification in combination with the drawings in which:

FIG. 1 is a perspective view, partly in schematic form, illustrating an apparatus for detecting and recording juglar venous pulsation embodying the invention;

FIG. 2 is a perspective view, partly in schematic form, illustrating another apparatus for detecting and recording jugular venous pulsation embodying the invention; and FIG. 3 is an expanded partial cross-sectional view taken along section line 3—3 shown in FIG. 1, to illustrate the motion of the indicator tab 10 relative to the photoelectric transducer housing 18 shown therein.

Reference is now made to FIG. 1 of the drawings, which illustrates an apparatus for detecting and recording venous pulsations embodying the invention. As illustrated therein, one end of an indicator, such as a small rectangularly shaped cardboard piece 10, is fixed on a portion of the patient's neck 12 by means of adhesive material, such as cellophane tape for example, in close proximity of the jugular vein 14, while the other end of the cardboard extends away from the skin, whereby the vein's pulsations are transmitted to the cardboard as translatory motion toward and away from the patient's skin.

The right side of the patient's neck is ordinarily preferred because it normally provides a more direct anatomical communication between the right atrium and superior vena cava and the right innominate and internal jugular veins. The location of the indicator cardboard piece 10, however, is not limited to this portion of the human body, but in general the neck region is preferred because of its accessability and the prominence of the pulsations. If the pulsations are more prominent, for a given patient, in the internal jugular vein the area of the neck just below the angle of the jaw or the supraclavicular fossa is preferred.

The indicator tab 10 must be opaque but it may be reflective or non-reflective. As it will be explained later, the amount of light from the ambient lighting reflected by the indicator does not substantially alter the operation of the apparatus so that theoretically the indicator tab could be made with non-reflective material.

A photoelectric transducer, such as a photocell 16 for example, is mounted in a light shielding sleeve such as the housing enclosure 18. The photocell 16 may be a selenium photocell having an electrical response between 0.3 and 0.4 volt and 1.25 and 2.00 milliamperes to ordinary sunlight. The light shielding sleeve 18 may be cylindrical or with rectangular cross-section as illustrated in FIG. 1.

The housing 18 may include an outer shell or cover 20, of similar shape, and which is slidably mounted on the housing 18 to vary the maximum amount of light impinging on the photocell 16 by sliding the cover 20 over the housing 18 a desired amount.

The housing 18 includes an end wall on which the photocell 16 is mounted, and is open at the opposite end to provide a window to receive light within the enclosure 18. The cover 20, may in turn be open ended or it may have an end wall having a perforation or opening of a desired size to permit light to enter into the enclosure.

As shown in FIG. 1, the leads 24 of the photocell 16 are inserted through the end wall of the housing 18 for mounting the photocell 16 in the enclosure and to permit electrical connection of the photocell to the display means 19.

The housing 18 and photocell 16 are illustrated in a somewhat enlarged relation to the head of the patient and the indicator tab 10, in order to show certain details with greater clarity.

As previously described, the leads 24 of the photocell 16 are connected to the terminals of the display means 19, which may comprise the bipolar leads of an electrocardiographic apparatus. The display means thus records the electrical response of the photocell 16 to the light signal impinging thereon. In the alternative the display means may comprise a voltmeter or an ammeter to indicate the electrical signal derived from the photocell.

In operation, as shown in FIGS. 1 and 3, the photocell housing 18 is placed in close proximity to the indicator tab 10. Good results have been obtained when the housing 18 is placed between ½ and ¼ inch away from the indicator tab 10. The maximum intensity of the light impinging upon the photocell 16 is varied as previously explained, by sliding the cover 20 over the housing 18 a desired amount. The amount of ambient light reaching the photocell is effectively determined by the distance between the photocell 16 and the indicator 10. Thus, the contractions and expansions of the jugular vein 14, caused by the pumping of the blood into and out of the heart, are translated into motion of the indicator tab 10 towards and away from the housing 18. This motion in turn modulates the amount of ambient light entering the housing enclosure and hence the amount of light that impinges upon the photocell 16. The electrical response of the photocell is then an electrical signal which may control the motion of a recording apparatus, such as display means 19, and hence record the pulsations of the patient's vein.

An alternate embodiment of the invention is illustrated in FIG. 2, wherein primed numerals are employed to indicate elements similar to the ones shown in FIG. 1.

The housing 18' is cylindrical in form, and it has an open end positioned in close proximity to the indicator tab 10'. A photocell, not shown, is mounted at the opposite end of the housing 18' in a manner similar to the one described in connection with the embodiment illustrated in FIG. 1. In addition, the housing 18' may have an additional telescoping cylindrical portion to vary the maximum amount of light reaching the photocell.

In the embodiment illustrated in FIG. 2, a light source 25 is mounted on the indicator 10'. The light source 25 may be a light-weight low current small light bulb, for example, and it may be electrically connected to a source of unidirectional potential such as a battery 26. The electrical output of the battery 26 may be varied to control the light intensity radiated by the light source 25, and hence the electrical output of the photocell 16.

The intensity of the light impinging on the photocell, and hence the electrical response of the photocell, are modulated by the pulsating motion of the indicator 10', along the longitudinal axis of the housing 18', towards and away from the housing 18'. For the reasons given above, the motion described above is made in response to the pulsations of the jugular vein 14 and therefore the electrical variation in response to such a motion is an electrical representation of the jugular venous pulsations.

It should be noted that the embodiments described above permit recording of venous pulsations while providing mechanical amplification of such pulses, thus permitting observation of very subtle pulses which would not be easily observed otherwise. In addition, recording of venous pulses may be obtained in the same recording with the behavior of the heart, such as by connecting the photocell in series with the patient and the leads of a cardiographic apparatus.

What is claimed is:

1. Apparatus suitable for use in combination with a patient to continuously detect and record venous pulsation comprising: a tab having one end adapted for attachment in close proximity to a patient's vein so that said tab will be deflected about said one end from at least a first position to a second position in response to each pulsation of said vein; an elongated rigid light-transmitting housing having a first and second end, said first end being disposed in close proximity to said tab; means at the second end of said housing for measuring the intensity of light transmitted within said housing from said first end to said second end; means for converting said measured light to an electrical signal having a magnitude proportional to the magnitude of the light; and means for continuously recording said signal, the intensity of light transmitted from said first end to said second end being varied by deflection of said tab from said first position to said second position in response to each said pulsation.

2. Apparatus as defined in claim 1 wherein said transmitted light is ambient light.

3. Apparatus as defined in claim 1 and further characterized by a light source attached to said tab for providing said transmitted light.

4. Apparatus as defined in claim 1 wherein said measuring means comprises a photocell.

5. Apparatus as defined in claim 1 wherein said housing includes an outer light-transmitting shell slidably mounted thereon for varying the maximum angle of light received by said measuring means.

References Cited

UNITED STATES PATENTS

| | | | |
|---|---|---|---|
| 2,445,672 | 7/1948 | Jones | 128—2.05 |
| 2,540,163 | 2/1951 | Brosene et al. | 128—2.05 |
| 2,711,728 | 6/1955 | Bailey | 128—2.05 |
| 3,229,685 | 1/1966 | Ringkamp et al. | 128—2.05 |

RICHARD A. GAUDET, *Primary Examiner.*

SIMON BRODER, *Examiner.*